Patented Sept. 11, 1928.

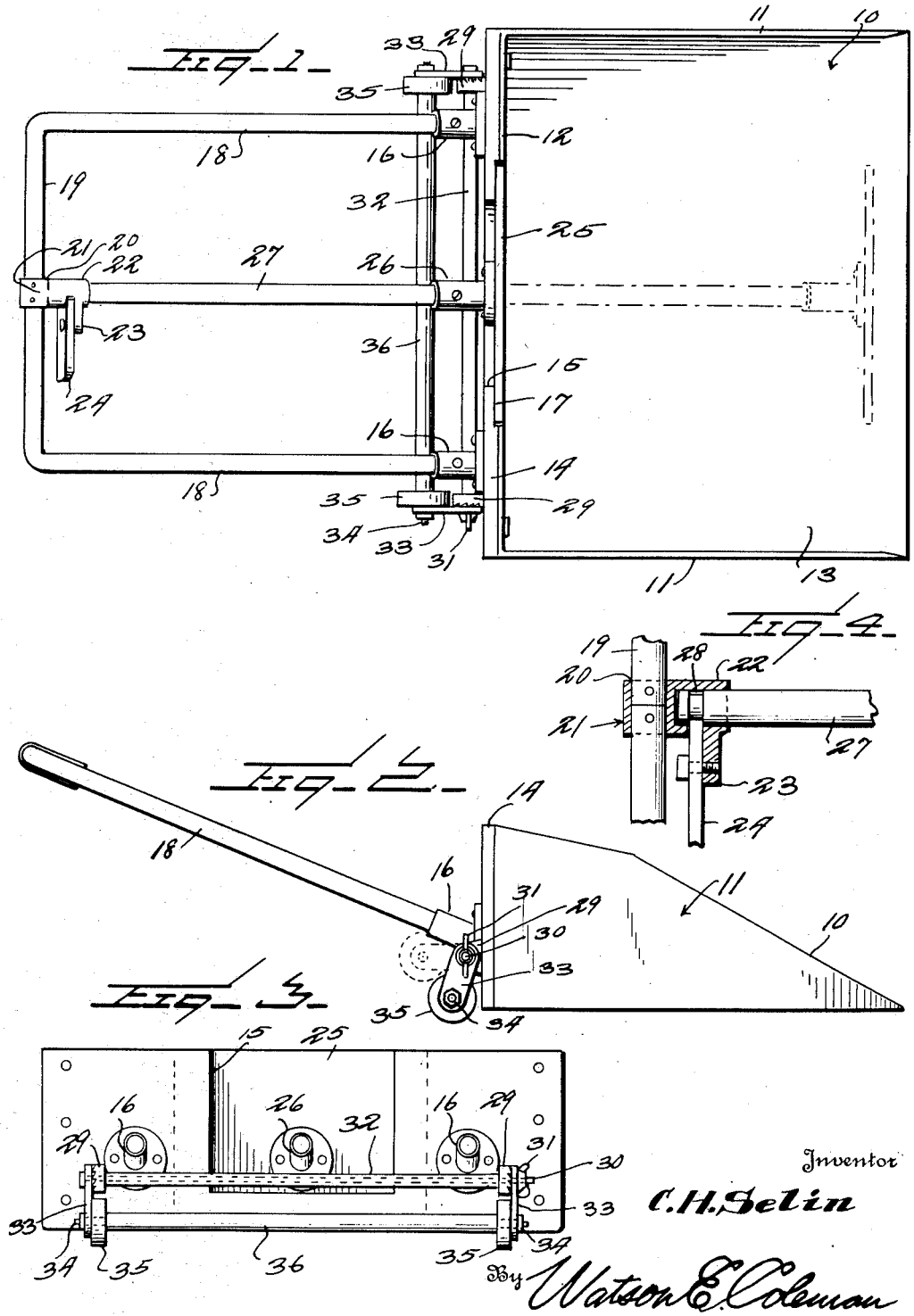

1,683,732

UNITED STATES PATENT OFFICE.

CHARLES H. SELIN, OF BROOKLYN, NEW YORK.

SNOW AND STREET CLEANING SHOVEL.

Application filed November 26, 1927. Serial No. 235,936.

This invention relates to shovels, and particularly to shovels adapted to be used for cleaning or removing snow and for cleaning streets.

The general object of the invention is to provide a shovel having a pusher or plunger forming part of the rear wall of the shovel, which under ordinary circumstances is connected to the handle of the shovel but may be disconnected therefrom and forced forward to eject the contents of the shovel.

A further object is to provide means whereby the shovel may be supported upon wheels when necessary as, for instance when traveling over bare ground these wheels permitting the shovel to be tilted so as to raise the forward end of the shovel and permit the shovel to ride up on a heap so as to deposit the load on top of the heap, the wheels being shiftable to a position where the shovel will engage against the ground or snow for the entire extent of its bottom.

Other objects will appear in the course of the following description.

My invention is illustrated in the accompanying drawing, wherein:—

Figure 1 is a top plan view of a shovel constructed in accordance with my invention;

Figure 2 is an end elevation thereof;

Figure 3 is a rear elevation of the shovel;

Figure 4 is a detail fragmentary section of the handle socket member.

Referring to this drawing, 10 designates the scoop or shovel proper having the side walls 11, the rear wall 12 and the bottom 13. The bottom and end walls of the scoop are formed of sheet metal as, for instance, steel and these bottom and rear walls are inturned and riveted or otherwise joined to a casting 14. This casting 14 is cut away at its middle, as at 15, and is provided with two outwardly and upwardly projecting sockets 16 which may be riveted to or otherwise carried by the casting 14. This casting 14 is recessed at 17 entirely around the cut-away portion 15.

Disposed in the sockets 16 and extending upward and rearward therefrom are the two handle section 18, the upper ends of which are angularly turned, as at 19. The ends of these handle sections are received within the tubular portion 20 of a member 21 which is provided with a socket 22. Mounted upon a lug 23 of this member 21 is a pivoted latch 24 which, when projected, extends through a slot formed in the wall of the socket 22.

Adapted to fit within the recess 17 and form part of the rear wall of the scoop or shovel proper is a pusher plate or plunger 25 which carries a socket 26 from which extends the handle 27. This handle at its upper end is formed with an annular recess 28 adapted to be engaged by the latch 24, and when so engaged the pusher plate and the handle 27 constitute part of the manipulating handle of the shovel as a whole, but when the latch 24 is released the handle 27 may be shifted forward to cause the pusher to force out the contents of the shovel, as illustrated in dotted lines. This pusher, when entirely detached from the shovel, may be used as a scraper or push hoe.

Preferably the rear end of the shovel or scoop 10 is mounted upon wheels, and to this end the rear wall of the shovel is provided with outwardly projecting lugs 29 which have toothed outer faces. Passing through the lugs is a long bolt 30 which may be provided with a head at one end and a nut 31 at the other and this bolt passes through links 33, these links being formed upon their surfaces confronting the lugs 29 with ratchet teeth complementary to the teeth on the lugs. A spacing sleeve 32 is disposed around the bolt 30 and between the lugs 29 so as to take strain off these lugs. Passing through the links 33 is a through bolt 34 supporting the rollers or wheels. These wheels are held in spaced relation to each other by a sleeve 36 surrounding the through bolt.

It will be seen that by loosening the nut 31 the links may be shifted into any desired angular relation to the back of the shovel and then by returning the nut these links may be held in adjusted position either with the rollers or wheels raised or lowered. When the wheels are raised, the shovel will rest upon its bottom and this position will be the ordinary position used for such work as shoveling snow or shoveling dirt from the face of a pavement. Where the shovel is to travel over bare earth as, for instance, where snow has been scooped up and then the shovel has to travel over a space which has been swept bare by the wind, the wheels may be turned down. When the wheels are turned down, the shovel may be lifted or tilted upon these wheels as upon a fulcrum, all bearing down upon the handle and the forward end of the shovel raised, thus permitting very easy travel of the shovel and premitting the forward end of the shovel to be raised to a level with the top of a heap or mound of snow or dirt radiator of an automobile. The pipe section upon the mound either by operating the pusher in the manner heretofore stated or by lifting up upon the rear end of the shovel to tilt it or by both.

It will be seen that the construction which I have described provides a very simple but effective shovel of the character stated, that the handle formed by the members 18 and the cross bar 19 is braced under normal circumstances by the member 27, but that this member or handle 27 may be readily detached from the main handle to permit the pusher to be operated to eject the contents of the shovel or to be used separately. The construction is strong and will withstand the strains to which shovels of this character are particularly subjected. The latch construction permits the ready detachment of the shovel handle and its ready attachment. It will be seen that no strain comes upon the latch in pushing the shovel forward, as the rear end of the handle 27 will rest against the inner end of the socket 22. It will also be seen that the wheels keep the heel of the scoop or shovel off the ground, thereby prolonging the life of the shovel. The steel scoop or shovel proper is to be so made that there will be no projecting rivets to offer resistance to the forward movement of the shovel, and the casting 14 will be so arranged that different sized scoops or shovels proper can be attached by riveting or bolting to this casting so that shovels or scoops which have become worn out may be replaced.

I claim:—

1. A shovel of the character described including a scoop portion having a rear wall, a casting with which the scoop portion is engaged, handle sockets mounted upon said casting, upwardly and rearwardly extending handles connected therewith, and wheels mounted upon said casting and adapted to be turned downward into a supporting position or upward into an inoperative position, the wheels having means whereby they may be locked in either of their adjusted positions.

2. A shovel including a scoop portion having a back, the back being cut out at the middle, a pusher plate forming part of the rear wall of the scoop portion, a handle extending upward and rearward from the shovel, and a handle for said pusher.

3. A shovel including a scoop portion having a back, the back being cut out at the middle, a pusher plate forming part of the rear wall of the scoop portion, a handle extending upward and rearward from the shovel, and a handle for said pusher, the handle of the shovel and the handle of the pusher having detachable engagement with each other.

4. A shovel of the character described having a rear wall cut away at its middle and being formed with upwardly and rearwardly extending handle sockets, handle sections extending upward and rearward from each socket and then extending toward each other, a member engaging the handle sections with each other and formed with a socket, a pusher forming part of the rear wall of the shovel, and a handle extending upward and rearward from the pusher and having detachable engagement in said last named socket.

5. A shovel having a rear wall formed with upwardly and rearwardly projecting sockets, a U-shaped handle member having its legs engaged in said sockets, a socket carried upon the U-shaped handle member at its middle, a pusher plate forming normally part of the rear wall of the shovel, and a handle extending upward and rearward from the pusher plate and detachably engaged with said socket.

6. A shovel having a rear wall formed with upwardly and rearwardly projecting sockets, a U-shaped handle member having its legs engaged in said sockets, a socket carried upon the U-shaped handle member at its middle, a pusher plate forming normally part of the rear wall of the shovel, a handle extending upward and rearward from the pusher and formed at its upper end with a circumferential recess, and a latch mounted upon the socket and adapted to engage in said recess.

7. In a shovel, a scoop having an upwardly and rearwardly projecting handle, ears on the scoop having toothed outer faces, a bolt passing through the ears, links pivotally mounted upon the bolt and having toothed inner faces confronting the faces on the ears, a nut on the bolt whereby the links may be held in engagement with the ears, a longitudinally extending bolt mounted upon the ends of the links, and wheels mounted thereon.

In testimony whereof I hereunto affix my signature.

CHARLES H. SELIX.